United States Patent [19]

Mats

[11] Patent Number: 5,120,119

[45] Date of Patent: Jun. 9, 1992

[54] SPECTACLES HAVING HEAD RETAINERS

[76] Inventor: Yoshiro N. Mats, 1-10-1105, Minami Aoyama 5-chome, Minato-ku, Tokyo, Japan

[21] Appl. No.: 511,709

[22] Filed: Apr. 20, 1990

Related U.S. Application Data

[62] Division of Ser. No. 317,312, Mar. 1, 1989, abandoned.

[51] Int. Cl.⁵ .............................................. G02C 1/00
[52] U.S. Cl. ................... 351/157; 351/156; 351/158
[58] Field of Search ............... 351/41, 156, 157, 158, 351/123, 118; 2/452, 13; 24/3 C

[56] References Cited

U.S. PATENT DOCUMENTS

| 171,056 | 12/1853 | Schiaparelli | 351/156 X |
| 1,026,272 | 5/1912 | Leveque | 2/425 |
| 3,308,376 | 6/1962 | Kancepolsky | 351/157 |
| 4,139,281 | 2/1979 | Luttner | 351/158 |

FOREIGN PATENT DOCUMENTS 2155 of 1797 United Kingdom ............... 351/156

OTHER PUBLICATIONS

Tel Specs, San Francisco Chronicle, Jun. 26, 1964, Advertisement.

Primary Examiner—Rodney B. Bovernick
Attorney, Agent, or Firm—Jordan & Hamburg

[57] ABSTRACT

The present invention provides a pair of spectacles comprising a pair of lenses held by the respective lens frames, a side extending ackwardly from each of said lens frames and balancing means for eliminating or reducing the load on the nose of a user. Therefore, the spectacles of the present invention requires no or substantially no bridge means for supporting the weight of the spectacles on the nose of the user.

10 Claims, 5 Drawing Sheets

SPECTACLES HAVING HEAD RETAINERS

This is a division of application Ser. No. 317,312, filed Mar. 1, 1989, now abandoned.

BACKGROUND OF THE INVENTION

1. Field of the Invention

The present invention relates to new spectacles or glasses.

2. Description of the Prior Art

The conventional spectacles generally comprises a pair of spectacle lenses each supported by a lens frame, bridge means for connecting the lens frames with each other and for supporting the weight of the spectacles on the user's nose, and a side pivotally connected with each of the lens frames and extending backwardly so that it can be placed on the top of the ear of a user to hold the spectacles against the user's head.

Since the weight of the spectacles is substantially exerted on the user's nose, it is frequent that the user is made unpleasant.

SUMMARY OF THE INVENTION

It is therefore an object of the present invention to provide new spectacles or glasses which will exert no or substantially no weight of the spectacles on the nose of the user.

To this end, the present invention provides a pair of spectacles or glasses which comprises means for balancing the weight of the spectacles such that the load on the nose will be eliminated or reduced.

In one aspect of the invention, the balancing means comprises a counter-weight mounted on the backward end of each of the spectacle sides.

In another aspect of the present invention, the balancing means comprises a backward member for connecting the backward end of the spectacle sides with each other.

In such an arrangement, the load on the user's nose can be remarkably reduced or completely eliminated. In some preferred embodiments of the invention, the bridge connecting the lens frames with each other can be omitted.

BRIEF DESCRIPTION OF THE DRAWINGS

The present invention will now be described with reference to the drawings in connection with various embodiments of the present invention. It is to be understood that similar parts are denoted by similar reference numerals throughout the drawings in which.

DETAILED DESCRIPTION OF THE PREFERRED EMBODIMENTS

Figure 1:
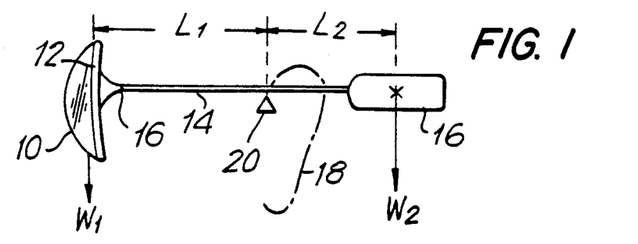
FIG. 1 is a side view showing one preferred embodiment of a pair of spectacles constructed according to the present invention.

Referring first to FIG. 1, there is shown a pair of spectacles which comprises a pair of spectacle lenses 10 (only one shown) respectively held by lens frames 12, a straight side 14 pivotally connected with each of the lens frames 12 and extending backwardly therefrom, and a counter-weight or balancing element 16 rigidly connected with the backward end of each of the sides 14.

In such an arrangement, the spectacles can be worn on the head of a user at the top of the user's ears 18 such that the weight of the spectacles will be balanced about a point 20 on each ear 18. This may be explained by the following formula:

$$W_1 \times L_1 = W_2 \times L_2$$

where $W_1$ is a weight of each of the lenses 10; $L_1$ a distance between the fulcrum point 20 and each lens 10; $W_2$ a weight of each of the counter-weights 16; and $L_2$ a distance between the fulcrum 20 and each of the counter-weights 16.

As will be appreciated, the moment of the spectacles about the fulcrum 20 can be adjusted by increasing or decreasing the distance $L_2$ between the fulcrum 20 and each of the counter-weights 16. In such a manner, the load on the user's nose can be nullified.

Figure 2:
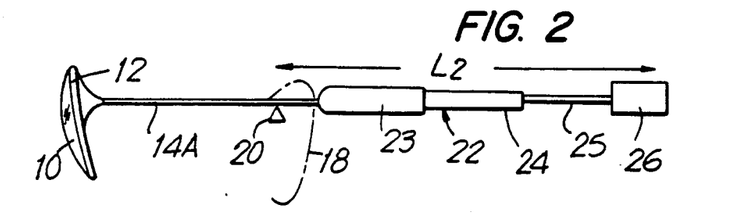
FIG. 2 is a side view similar to FIG. 1, showing the spectacles under another condition.

Referring now to FIG. 2, there is shown a pair of spectacles having the same construction as in FIG. 1 except having an extendable spectacle side 14A that is pivotally connected with each of the lens frames 12. The extendable spectacle side 14A includes a telescopic section 22 connected with the backward end thereof. The telescopic section 22 comprises a plurality of nested portions (three in the illustrated embodiment) 23, 24 and 25, with the most-backward nested portion 24 being connected with a counter-weight 26. The length of the telescopic section 22 can be adjusted depending on the weight of the spectacles and/or the position of the user's ears. The variation of the length of the telescopic section 22 permits the counter-weight 26 to be reduced in weight or size. The telescopic section 22 can be contracted when the spectacles are not used.

Figure 3:
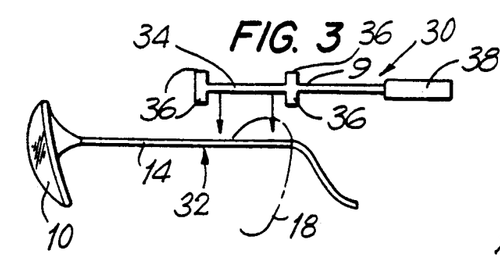
FIG. 3 is a side view showing a modification of the spectacle shown in FIGS. 1 and 2.

FIG. 3 shows a modification of the spectacles according to the present invention, in which a balancing member 30 is mounted on the conventional spectacles 32. The balancing member 30 comprises an elongated support portion 34 having four tabs 36 laterally extending therefrom at the opposite sides and a counter-weight 38 rigidly connected with the support portion 34 at the backward end thereof. To mount the balancing member 30 on the conventional spectacles 32, the balancing member 30 is applied to each of the spectacle sides 14 and all the four tabs 36 thereon are then turned in against the inner face of the side 14 to secure the balancing member 30 against the conventional spectacles 32. Any adhering tape or the like may be used to support the balancing member 30 on the spectacles 32 more securely.

Figure 4:
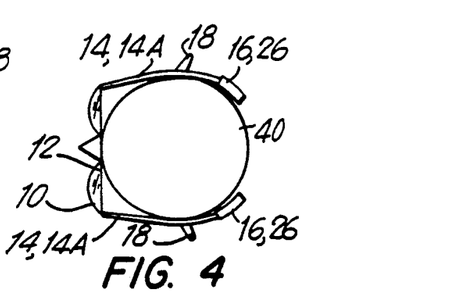
FIG. 4 is a top view of the head of a user on which the spectacles of the present invention shown in FIGS. 1 and 2 is worn.

As shown in FIG. 4, each of the spectacle sides 14 or 14A may be curved inwardly against the user's head 40 at the counter-weight 16 or 26 to be compatible with the curvature of the user's head.

Figure 5:
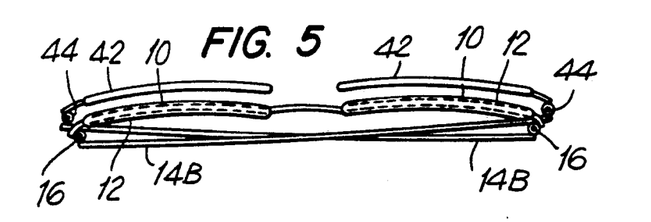
FIG. 5 is a plan view showing another preferred embodiment of the spectacles according to the present invention in a position that the spectacles are folded or closed into their unused state.
Figure 6:
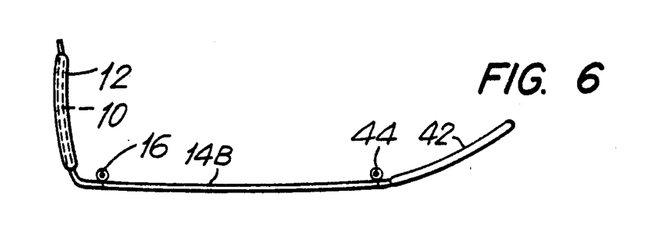
FIG. 6 is a plan view showing the spectacles only on one side, which is opened into its used state.

Referring now to FIGS. 5 and 6, there is shown a further embodiment of the spectacles according to the present invention, which comprises a pair of lenses 10 respectively held by lens frames 12, a spectacle side 14B pivotally connected with each of the lens frames 12 at 16, and a counter-weight or balancing member 42 pivotally connected at 44 with the backward end of each of the spectacle sides 14B. In this embodiment, the balancing member 42 also serves as a cover for protecting the respective lens 10 when the spectacles are folded into the unused state. The cover 42 is preferably made of a soft material such as plastics or rubber and/or formed to have a relatively extended shape. At this time, the cover or balancing member 42 will engage the user's head more softly while stabilizing the spectacles on the user's head.

In the embodiment of FIGS. 5 and 6, the lens cover 42 may have its weight which does not function as a balancing counter-weight as in the previous embodiments, since the lens cover 42 can engage the user's head to hold the spectacle more securely without load on the user's nose.

Figure 7:
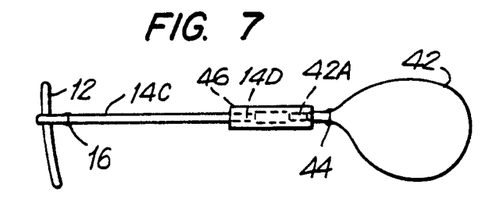
FIG. 7 is a side view of the spectacles shown in FIGS. 5 and 6.

FIG. 7 shows a modification of the spectacles shown in FIGS. 5 and 6, which comprises a resilient connecting tube 46 for connecting the backward cut end 14D of each of the spectacle side 14C with the forward cut end 42A of the corresponding lens cover 42. The length of each of the side sections in the spectacles can be adjusted by moving the cut ends of the side and cover relative to each other within the connecting tube 46.

Figure 8:
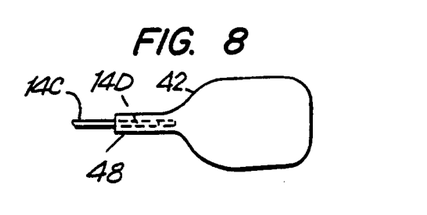
FIG. 8 is a side view showing a modified connection between each spectacle side and the corresponding counter-weight means.

FIG. 8 shows another modification which comprises a connecting tube 48 formed integrally in the forward portion of the lens cover 42. The connecting tube 48 receives the backward cut end 14D of each of the spectacle side 14C to secure it on the spectacles. Also at this case, the length of the side section can be adjusted by moving the backward cut end 14D of the spectacle side 14C within the connecting tube 48.

Figure 9:
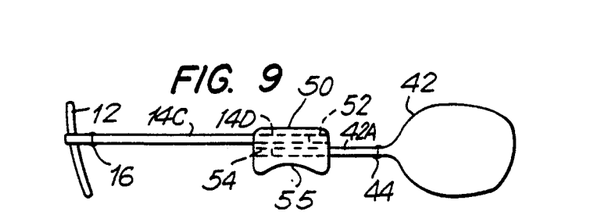
FIG. 9 is a side view showing a further modified connection between each spectacle side and the corresponding counter-weight means.

In FIG. 9, the backward cut end 14D of each of the spectacle sides 14C is connected with the forward cut end 42A of the lens cover 42 through a connecting tube 50. The connecting tube 50 is formed with two through-holes 52 and 54 spaced away from one above another and parallel to each other. Each of these through-holes 52 or 54 receives the corresponding cut ends of the spectacle side or lens cover. The length of the side sections in the spectacles can be adjusted by moving the cut ends of the respective parts within the connecting tube 50. The connecting tube 50 also includes a curved bottom 55 formed therein which is adapted to be placed on the top of the user's ear.

Figure 10:
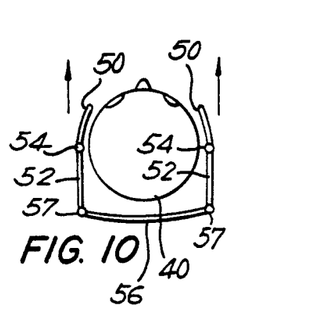
FIG. 10 is a top view showing the user's head on which still another embodiment of the spectacles according to the present invention is being worn.
Figure 11:
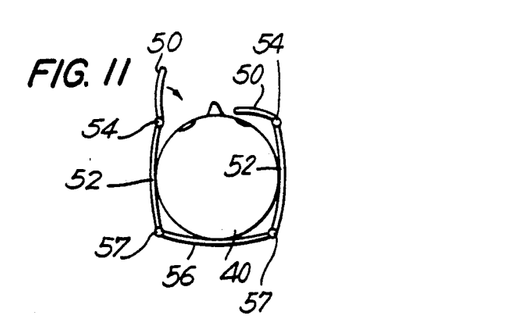
FIG. 11 is a top view similar to FIG. 10, showing the spectacles being mounted into its use state.
Figure 12:
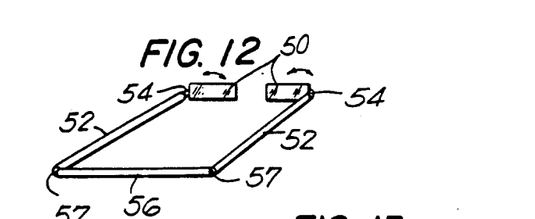
FIG. 12 is a perspective view of the spectacles shown in FIGS. 10 and 11.

Referring now to FIGS. 10, 11 and 12, there is shown a further embodiment of the present invention, in which an improved pair of spectacles comprises a pair of lenses 50 each pivotally connected at 54 with the forward end of each of spectacle sides 52, and a backward connecting member 56 pivotally connected between the backward ends of the spectacle sides 52 at pivots 57. Such an arrangement requires no bridge for connecting between the spectacle lenses.

On use, the spectacles are mounted backwardly on the user's head 40 and then the lenses 50 are turned inwardly about the respective pivots 54 to place on the appropriate front of the user's face.

Figure 13:
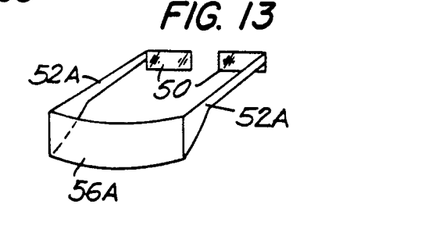
FIG. 13 is a view similar to FIG. 10, showing a modification of the spectacles shown in FIGS. 10, 11 and 12.
Figure 14:
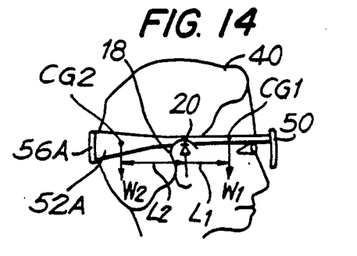
FIG. 14 is a side view of a further embodiment of the spectacles constructed according to the present invention.

FIGS. 13 and 14 illustrate a modification of the spectacles shown in FIGS. 10 through 12, in which the backward connecting member 56A and the backward ends portion of the spectacle sides 52A are widened. The distribution of weight in the spectacles is so designed that when the spectacles are worn on the user's head 40 as shown in FIG. 14, the aforementioned formula, $L_1W_1 = L_2W_2$, is fulfilled where $W_1$ is a weight on the center of gravity CG1 in the side section between the fulcrum 20 on the ear 18 and the corresponding lens 50; $W_2$ a weight on the center of gravity CG2 in the side section between the fulcrum 20 and the backward connecting member 56A; $L_1$ a distance between the fulcrum 12 and the center of gravity CG1 and $L_2$ a distance between the fulcrum 12 and the center of gravity CG2. In such a case, the weight of the spectacles about the fulcrums 12 on the user's ears 18 can be appropriately balanced without any bridge which would be required to support the spectacles on the user's nose in the prior art.

Figure 15:
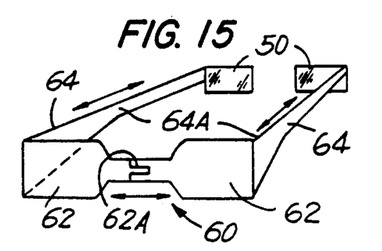
FIG. 15 is a perspective view of the spectacles shown in FIG. 14.
Figure 16:
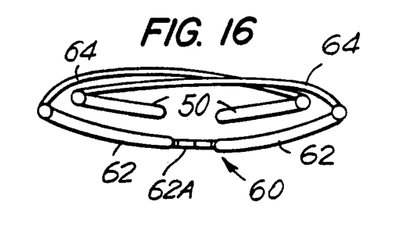
FIG. 16 is a plan view of the spectacles shown in FIGS. 14 and 15 when they are folded into their unused state.

FIGS. 15 and 16 show a further modification of the spectacles shown in FIGS. 10 through 14, in which a backward connecting member 60 is divided into two backward sections 62. These backward sections 62 are connected with each other through an extendable connection 62A such that the length of the backward connecting member 60 can be adjusted to accommodate the size of the user's head. It is also preferred that each of the spectacle sides 64 is formed to extend its length through a extendable connection 64A. It is further preferred that each of the backward sections 62 is of substantially the same size and shape as those of each lens 50. In such a case, when the spectacles are folded into their unused state, the backward sections 62 can cover and protect the spectacle lenses 50.

Figure 17:
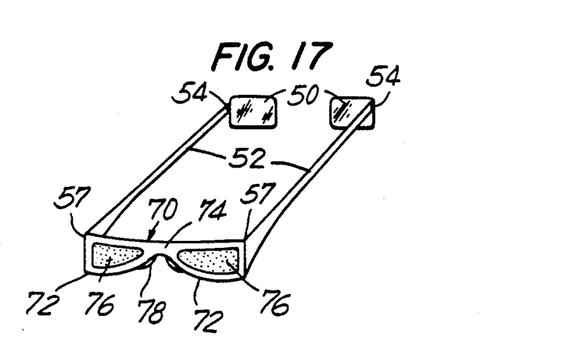
FIG. 17 is a perspective view showing a modification of the spectacles shown in FIGS. 14, 15 and 16.

A pair of spectacles shown in FIG. 17 has substantially the same construction as that of the spectacles shown in FIGS. 10 through 13 except that the backward connecting member 70 is divided into two backward lens frames 72 which are connected with each other through a bridge 74. Each of the backward lens frames 72 holds a colored lens 76. The spectacles also has pad bridges 78 each of which is formed integrally with the corresponding backward lens frame 72.

The spectacles shown in FIG. 17 can be used as a pair of sunglasses in the opposite manner as in FIG. 14. In other words, the backward connecting member 70 can be placed on the front of the user's face as in the conventional glasses. At this time, it is of course that the spectacles of the present invention is used through the bridge 74 and the pad bridges 78 in the same manner as in the conventional spectacles.

Figure 18:
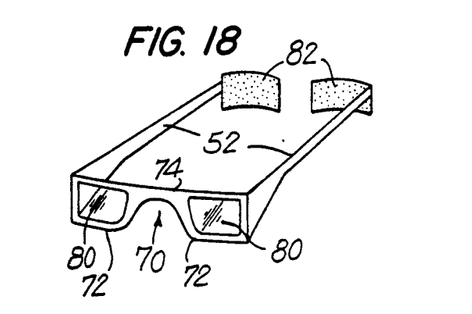
FIG. 18 is a perspective view showing a further modification of the spectacles shown in FIGS. 14, 15 and 16.

FIG. 18 shows the opposite arrangement as that of the spectacles shown in FIG. 17. In other words, the colored lenses 76 held by the backward lens frames 72 are replaced by transparent lenses 80 while the forward transparent lenses 50 are replaced by colored lenses 82.

Figure 19:
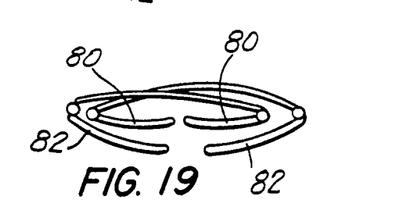
FIGS. 19 and 20 are plan views respectively showing further modifications of the spectacles shown in FIGS. 14 through 17, which can be folded in different manners.

FIG. 19 shows the spectacles of FIG. 18 when they are folded into their unused state in a different manner as that of the spectacles shown in FIG. 16. That is, the lenses 80 on the backward connecting member 70 are covered by the forward lenses 82.

Figure 20:
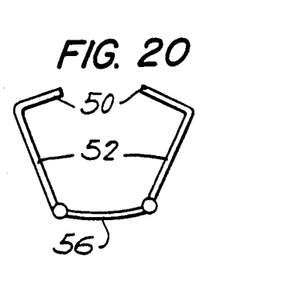

FIG. 20 shows a modification of the spectacles as shown in FIG. 12, in which each of the forward lenses 50 is connected integrally with the respective one of the spectacles sides 52 which in turn is pivotally connected with the backward connecting member 56.

Figure 21:
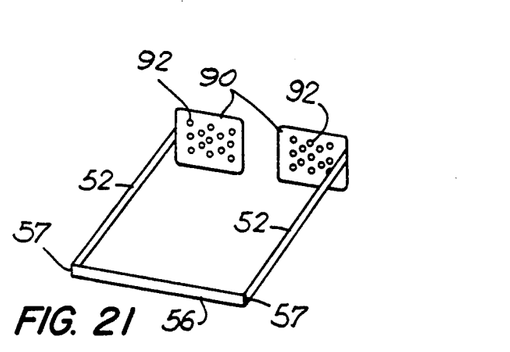
FIG. 21 is a perspective view of a further modification of the spectacles according to the present invention.

FIG. 21 shows a further modification of the spectacles according to the present invention, which is different from the spectacles shown in FIGS. 10 to 12 only in that the forward lenses are replaced by colored lenses 90 including a plurality of transparent portions 92 in the form of small apertures.

Figure 22:
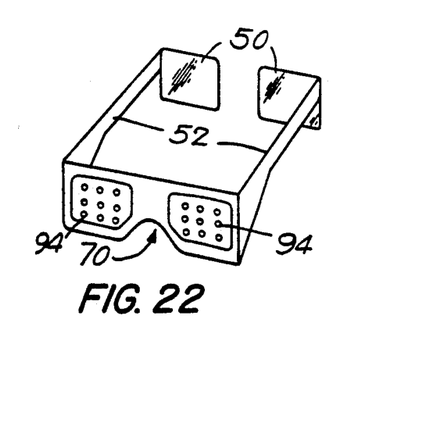
FIG. 22 is a perspective view of a still further modification of the spectacles according to the present invention.

FIG. 22 shows a further modification in which the colored lenses shown in FIG. 17 are replaced by the same colored lenses 94 as the colored lenses 90 shown in FIG. 21.

Figure 23:
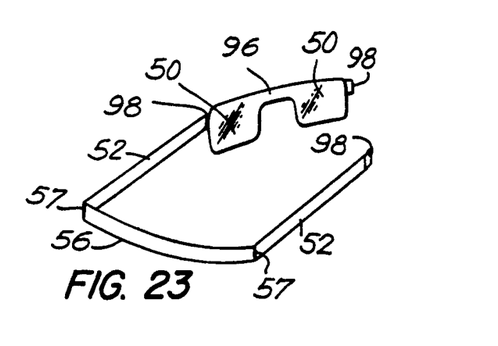
FIG. 23 is a perspective view of a further modification of the spectacles according to the present invention.

FIG. 23 shows the same arrangement as that of the spectacles shown in FIGS. 10 to 12, except that the forward lenses 50 are rigidly connected with each other through a central connection 96 to form a forward lens assembly. The forward lens assembly is pivotally connected at one end with one of the spectacle sides 52, the other end of the forward lens assembly being detachably connected with the other spectacle 52 as through a hook-latch connection 98.

Figure 24:
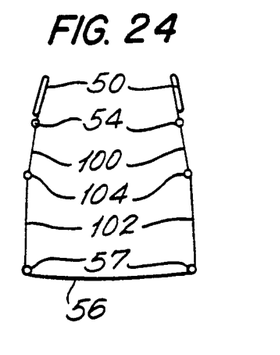
FIG. 24 is a plan view of a further modification of the spectacles according to the present invention in its fully opened state, which can be closed into their unused state in a different manner.
Figure 25:
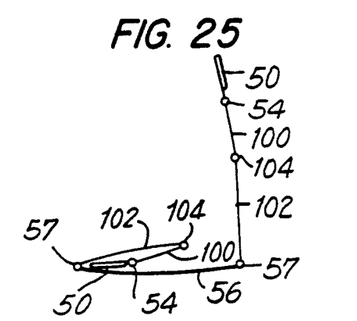
FIG. 25 is a view similar to FIG. 24, showing the spectacles being folded into its unused state.
Figure 26:
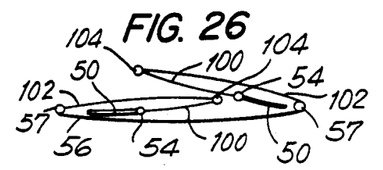
FIG. 26 is a view similar to FIGS. 24 and 25, showing the spectacles which has been substantially completely closed into their unused state.

FIG. 24 shows a further modification of the spectacles as shown in FIGS. 10 to 12, in which each of the spectacle sides 52 is divided into two side sections 100 and 102. The side sections 100 and 102 are pivotally connected with each other through a pivot 104. As can be seen from in FIGS. 25 and 26, such spectacles can be folded into a more compact state than those of the previous embodiments.

Figure 27:
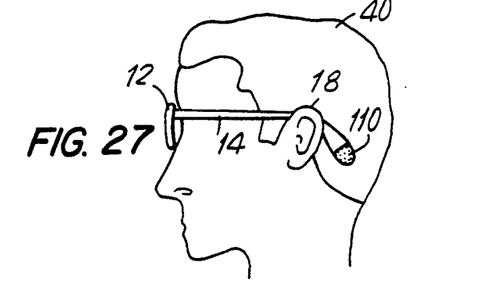
FIG. 27 is a side view showing a further embodiment of the spectacles according to the present invention in its used state wherein it is worn on the user's head.

Referring now to FIG. 27, there is shown a pair of spectacles having substantially the same construction as shown in FIGS. 1 through 4, except that a flat permanent magnet 110 is mounted on the backward end of each of the spectacle sides 14. Such a permanent magnet 110 may be probably influence the flow of blood within the user's head 40 near his ear 18.

Figure 28:
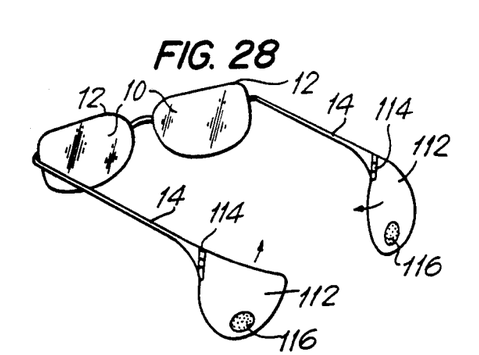
FIG. 28 is a perspective view showing a modification of the spectacles shown in FIG. 27.

FIG. 28 shows a modification of the spectacles shown in FIG. 27 in which the spectacles have a flat pad 112 pivotally connected with the backward end of each of the spectacle sides 14 through a hinge 114. When such spectacles are worn on the user's head, each of the pads 112 are turned against the user's head about the respective hinge 114 to hold the spectacles on the user's head more securely. It may be preferred that a permanent magnet 116 is mounted on each of the pads 112.

Figure 29:
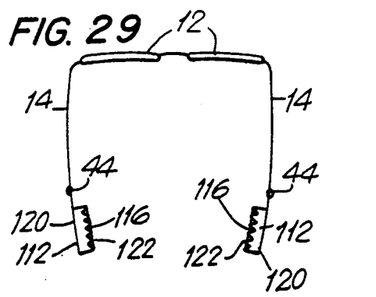
FIG. 29 is a plan view showing another modification of the spectacles shown in FIGS. 27 and 28.
Figure 30:
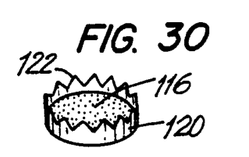
FIG. 30 is a perspective view of the counter-weight used in the spectacles of FIG. 29.

Referring to FIGS. 29 and 30, each of the permanent magnets 116 to be mounted on the respective pad 112 may be located within a crown-shaped receptacle 120. The receptacle 120 has a plurality of sawteeth 122 formed thereon at its opened edge.

Figure 31:
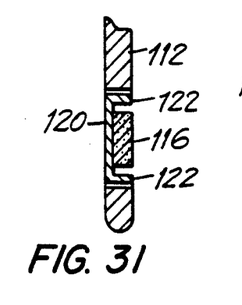
FIG. 31 is a cross-sectional view showing the backward end of one side of the spectacles in which a modified counter-weight is mounted.

Such an assembly consisting of the magnet 116 and the receptacle 120 may be embedded in each of the pads 112, as shown in FIG. 31.

In such an arrangement, the magnet assembly can increase the strength of the magnetic field created between the magnet 116 and the receptacle 120 while providing a mechanical stimulus to the user's head. Furthermore, any slippage between the backward ends of the spectacle sides and the user's head can be reduced by the magnet assemblies in the pads 112.

Figure 32:
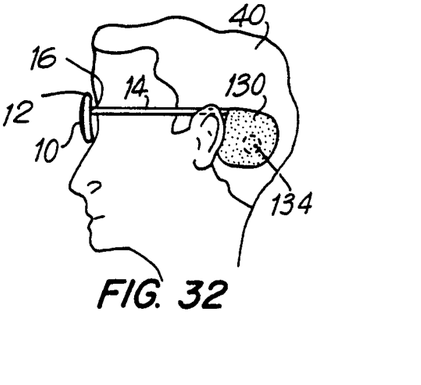
FIG. 32 is a side view showing a further embodiment of the spectacles according to the present invention.
Figure 33:
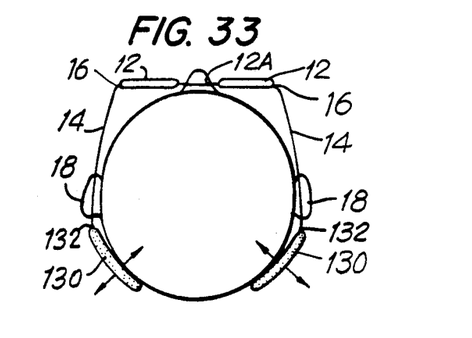
FIG. 33 is a plan view of the spectacles shown in FIG. 32.

FIGS. 32 and 33 show a pair of spectacles similar to those shown in FIG. 28, in which they comprise a pair of lenses 10 held by the respective lens frames 12, a bridge 12A connecting the lens frames 12 with each other and a pair of spectacle sides 14 each pivotally coupled at 16 with one of the lens frames 12. In this embodiment, a soft pad 130 is pivotally connected at 132 with the backward end of each of the spectacle sides 14. When the spectacles are worn on the user's head at his ears 18, the soft pads 130 are turned inwardly against the user's head 40 such that the inward face of each of the soft pads 130 will engage a recess 134 in the backward neck portion of the user's head 40. This assures that the entire weight of the spectacles can be supported by the soft pads 130 without any load on the user's nose. It may be preferred that each of the soft pads 130 is resiliently biased against the user's head under the action of any suitable spring means (not shown).

Furthermore, each of the soft pads 130 may include a counter-weight (not shown) embedded therein or a battery (not shown) which can supply a power to any electric equipment such as liquid crystal layers used to control the tranparency in the lenses.

Figure 34:
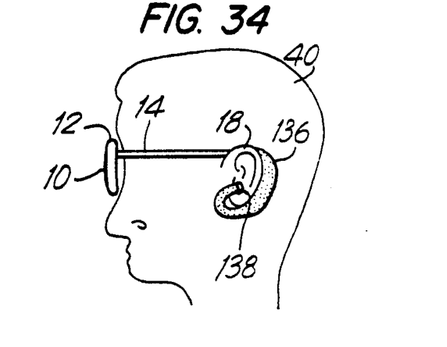
FIG. 34 is a side view showing a modification of the spectacles shown in FIGS. 32 and 33.

FIG. 34 shows a modification of the spectacles shown in FIGS. 32 and 33, in which a soft pad 136 connected with the backward end of each of the spectacle sides 14 is coiled with the free end thereof engaging a recess 138 in each of the user's ears 18. Thus, the spectacles can be supported more securely on the user's head.

Figure 35:
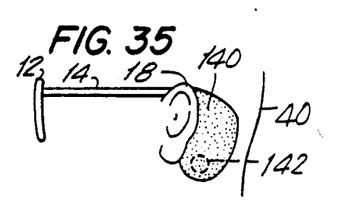
FIG. 35 is a side view showing another modification of the spectacles shown in FIGS. 32 and 33.
Figure 36:
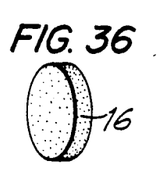
FIG. 36 is a perspective view showing a modified counter-weight preferably used in the present invention.

FIG. 35 shows a further modification of the spectacles shown in FIGS. 32 through 34, in which a soft pad 140 connected with the backward end of each of the spectacle sides 14 extends further downwardly along each of the user's ears 18. The bottom end of each of the soft pads 140 includes a permanent magnet 142 embedded therein, which may influence the flow of blood under the skin of the user's head 40.

Figure 37:
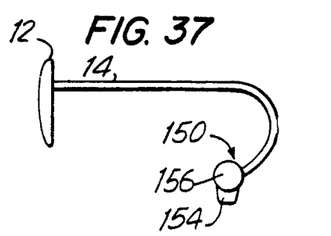
FIG. 37 is a side view illustrating a further embodiment of the spectacles according to the present invention.
Figure 38:
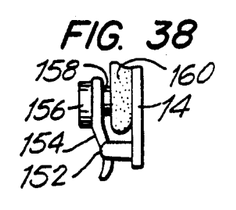
FIG. 38 is a side view of the balancing member shown in FIG. 37.
Figure 39:
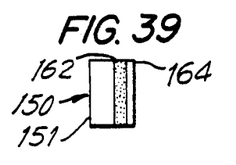
FIG. 39 is a side view illustrating the details of the earring used in the balancing member of FIGS. 37 and 38.

Referring now to FIGS. 37, 38 and 39, there is shown a balancing member 150 also serving as a decorative and holding member. The balancing member 150 includes a stub 152 rigidly connected with the backward curved end of each of the spectacle sides 14. A clamp 154 is pivotally connected with the outward end of the stub 152 and resiliently biased against the spectacle side 14 under the action of spring means (not shown). An earring 156 is rigidly mounted on the outer face of each of the clamps 154. As shown in FIG. 39, each of the earring 156 may include a decorative element 151 which can take a combination of various sizes, shapes and colors, a pressure-sensitive adhesive layer 162 which can be used to adhere that decorative element to the outer face of each of the clamps 154. When the decorative element 151 is unused, a release liner 164 is applied over the pressure-sensitive adhesive layer 162.

The balancing member 150 is utilized to hold the spectacles against the user's head when the earlobe 160 of each of the user's ears is held between the clamp 154 and the backward end of the respective spectacle side. At this time, any suitable decorative element 156 may be attached to each of the clamps 154. It may be further preferred that a permanent magnet 158 is mounted on the inner face of each of the clamps 154. Such a permanent magnet 158 serves to promote the flow of blood in the user's head and also to support the spectacles on the user's head in addition to the clamps 154 holding the spectacles.

Figure 40:
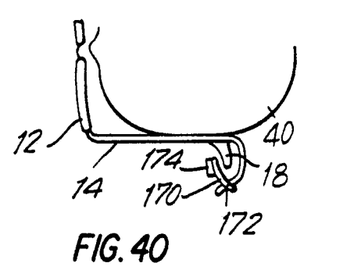
FIG. 40 is a fragmentary plan view of a further embodiment of the spectacles according to the present invention.

FIG. 40 shows a modification of the spectacles shown in FIGS. 37 to 39, in which the backward end of each of the spectacle sides 14 is turned outwardly to extend behind the user's ear. The tip of the spectacle side is spaced laterally from the corresponding ear of the user when the spectacles are worn on the user's head 40. A clamp 170 is pivotally mounted on the tip of the spectacle side 14 and resiliently biased against the portion of the spectacle side just behind the tip thereof.

This arrangement functions to displace the outer edge of the user's ear 18 outwardly such that any external sound may be taken by that ear more clearly. Since the outer edge of the user's ear is held between the clamp 170 and the backward end of the spectacle side 14, the user cannot be made unpleasant.

Any suitable decorative element 174 may be removably attached to the outer face of each of the clamps 170.

Figure 41:
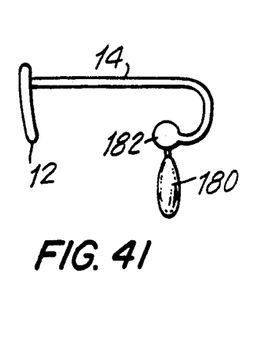
FIG. 41 is a fragmentary plan view of a further embodiment of the spectacles according to the present invention.

FIG. 41 shows a still further modification of the spectacles shown in FIGS. 37 to 39, in which a decorative element 180 is supported from the rounded tip of the U-shaped backward end of each spectacle side 14. The decorative element 180 serves as a balancing member or counter-weight in the spectacles.

Figure 42:
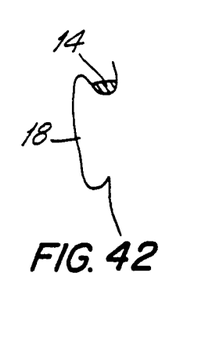
FIG. 42 is a fragmentary longitudinal cross-section of a further embodiment of the spectacles according to the present invention.
Figure 43:
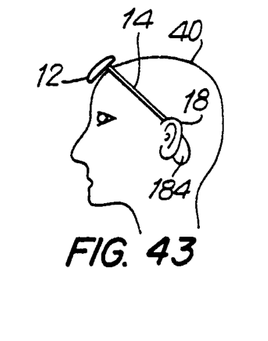
FIG. 43 is a side view showing a further embodiment of the spectacles according to the present invention when they are shifted into their unused position.

As shown in FIGS. 42 and 43, it is preferred that the spectacles of the present invention has two sides 14 each of which is of a flat rectangular cross-section since such cross-section applies a gentle pressure against the tops of the user's ears 18.

The spectacles having its balancing members on the backward ends of the spectacle sides 14 may be held at a position in which the forward lens frames 12 are located adjacent to the top of the user's head 40, under the influence of the balancing members 184.

In accordance with the present invention, further, any suitable electric equipment such as hearing aid, audiphone, radio receiver or the like may be embedded in the pad connected with the backward end of the spectacle side.

I claim:

1. Eyeglasses comprising a lens frame having a pair of elongated and generally parallel side members which are adapted to be disposed at the sides of the head of a person wearing said eyeglasses, each of said elongated side members having a front end portion and a rear end portion, first lens means mounted on said front end portion of one of said side members, said first lens means extending generally perpendicular to the longitudinal extent of said one side member, second lens means mounted on said front end portion of said other side member, said second lens means extending generally perpendicular to the longitudinal extent of said other side member, each of said first and second lens means having an inner terminal end spaced from one another such that each of said first and second lens means is solely supported by the respective side member on which said first and second lens means is mounted, and interconnecting means interconnecting said rear end portion of each of said side members and adapted to extend across the back of the head of a person wearing said eyeglasses, thereby forming bridgeless eyeglasses having side members connected to each other by interconnecting means which extend across the back of the head of a person wearing said eyeglasses, said interconnecting means comprising a third lens means comprising a pair of lenses such that said eyeglasses have two wearing modes, one of said wearing modes disposing said first and second lens means over a person's eyes and disposing said third lens means across the back of said person's head, said second wearing mode disposing said third lens means over a person's eyes and disposing said first and second lens at the back of a person's head.

2. Eyeglasses according to claim 1, wherein said third lens means comprises adjusting means for adjusting the spacing between each lens of said pair of lenses which constitute said third lens means.

3. Eyeglasses according to claim 1, wherein said first and second lens means are integrally connected to the front end portion of the respective side member on which said first and second lens means are mounted, further comprising pivot means pivotably mounting said third lens means on said rear end portion of said first and second side members, each of said side members and integrally connected respective first and second lens means being pivotal as two separate integral units relative to said interconnecting means.

4. Eyeglasses according to claim 1, wherein said first and second lens means each comprise colored lenses having a plurality of spaced non-colored and transparent circular portions.

5. Eyeglasses according to claim 1, wherein said third lens means comprises colored lenses having a plurality of spaced non-colored and transparent circular portions.

6. Eyeglasses according to claim 1, wherein said interconnecting means comprises an elongate member generally perpendicular to said side members.

7. Eyeglasses according to claim 1 further comprising pivot means pivotably supporting each of said first and second lens means to the respective side member.

8. Eyeglasses according to claim 1 further comprising pivot means pivotably connecting said interconnecting means to said rear end portion of each of said side members.

9. Eyeglasses comprising a lens frame having a pair of linearly elongated and generally parallel side members which are adapted to be disposed at the sides of the head of a person wearing said eyeglasses, each of said elongated side members having a front end portion and a rear end portion, first lens means mounted on said front end portion of one of said side members, said first lens means extending generally perpendicular to the longitudinal extent of said one side member, second lens means mounted on said front end portion of said other side member, said second lens means extending generally perpendicular to the longitudinal extent of said other side member, interconnecting means interconnecting said rear end portion of each of said side members, said interconnecting means being generally linear and extending generally perpendicular to the longitudinal extent of said pair of side members and extending across the back of the head of a person wearing said eyeglasses, wherein said eyeglass frames have a generally overall rectangular configuration in which said side members form two sides of the rectangle, said interconnecting means form another side of the rectangle, and said first and second lens means form a further side of the rectangle, bridge connecting means connecting said first lens means to said second lens means, pivot means pivotably mounting said first lens means on said front end portion of said one side member, and a readily detachable connecting means comprising a hook and latch connection detachably mounting said second lens means on said front end portion of said other side member, said readily detachable connecting means being readily detachable by a person wearing said glasses such that upon detachment of said readily detachable connecting means, said first and second lens means which are connected by said bridge connecting means can be pivotable as a unit about said pivot means to facilitate removal and placement of the eyeglasses on a wearer's head.

10. Eyeglasses comprising a lens frame having a pair of linearly elongated and generally parallel side members which are adapted to be disposed at the sides of the head of a person wearing said eyeglasses, each of said elongated side members having a front end portion and a rear end portion, first lens means mounted on said front end portion of one of said side members, said first lens means extending generally perpendicular to the longitudinal extend of said one side member, second lens means mounted on said front end portion of said other side member, said second lens means extending generally perpendicular to the longitudinal extent of said other side member, and interconnecting means interconnecting said rear end portion of each of said side members, said interconnecting means being generally linear and extending generally perpendicular to the longitudinal extent of said pair of side members and extending across the back of the head of a person wearing said eyeglasses, wherein said eyeglass frames have a generally overall rectangular configuration in which said side members form two sides of the rectangle, said interconnecting means form another side of the rectangle, and said first and second lens means form a further side of the rectangle, said interconnecting means comprising a first interconnecting part connected to said rear end portion of one of said one side members and a second interconnecting part connected to said rear end portion of said other side member, and extendable connecting means connecting said first and second interconnecting parts, whereby the distance between said parallel side members is adjustable to accommodate different wearer head sizes.

* * * * *

UNITED STATES PATENT AND TRADEMARK OFFICE
CERTIFICATE OF CORRECTION

PATENT NO. : 5,120,119
DATED : June 9, 1992
INVENTOR(S) : Yoshiro NakaMats It is certified that error appears in the above-identified patent and that said Letters Patent is hereby corrected as shown below:

On title page, item [76], "Yoshiro N. Mats" should read --Yoshiro NakaMats--.

Signed and Sealed this

Thirteenth Day of July, 1993

Attest:

MICHAEL K. KIRK

*Attesting Officer*   *Acting Commissioner of Patents and Trademarks*